United States Patent
Dondeti et al.

(10) Patent No.: US 7,395,423 B1
(45) Date of Patent: Jul. 1, 2008

(54) SECURITY ASSOCIATION STORAGE AND RECOVERY IN GROUP KEY MANAGEMENT

(75) Inventors: Lakshminath Dondeti, Chelmsford, MA (US); Michael Lee, Ottawa (CA); Frank Horsfall, Gloucester (CA)

(73) Assignee: Nortel Networks Limited (CA)

( * ) Notice: Subject to any disclaimer, the term of this patent is extended or adjusted under 35 U.S.C. 154(b) by 802 days.

(21) Appl. No.: 10/647,759

(22) Filed: Aug. 25, 2003

(51) Int. Cl.
*H04L 9/00* (2006.01)

(52) U.S. Cl. ...................................................... 713/151
(58) Field of Classification Search ................... 713/151
See application file for complete search history.

(56) References Cited

U.S. PATENT DOCUMENTS

| | | | |
|---|---|---|---|
| 6,760,444 B1 * | 7/2004 | Leung | 380/270 |
| 7,032,241 B1 * | 4/2006 | Venkatachary et al. | 726/4 |
| 7,086,086 B2 * | 8/2006 | Ellis | 726/15 |
| 2001/0020275 A1 * | 9/2001 | Jari et al. | 713/201 |
| 2002/0166070 A1 * | 11/2002 | Mualem et al. | 713/201 |
| 2004/0044891 A1 * | 3/2004 | Hanzlik et al. | 713/150 |
| 2004/0123153 A1 * | 6/2004 | Wright et al. | 713/201 |

\* cited by examiner

*Primary Examiner*—Kambiz Zand
*Assistant Examiner*—Aubrey H Wyszynski
(74) *Attorney, Agent, or Firm*—Anderson Gorecki + Manaras LLP

(57) ABSTRACT

A method for preserving security associations between at least two entities includes the steps of maintaining a security association relating to communication between the at least two entities in a table, and periodically storing the security association in non-volatile storage. With such an arrangement, in the event that data within the table become corrupted, it can be retrieved from storage. Because the key data is stored, performance losses due to re-establishing the secure group are minimized. In one embodiment, the security association is advantageously encrypted prior to storage to further secure the security associations for each member.

11 Claims, 3 Drawing Sheets

SECURITY ASSOCIATION STORAGE AND RECOVERY IN GROUP KEY MANAGEMENT

FIELD OF THE INVENTION

This invention relates generally to the field of security and more particularly to a method and apparatus for maintaining key associations between a pair of entities.

BACKGROUND OF THE INVENTION

Exemplary multicast applications, such as video broadcast or multicast file transfer, transfer content to a defined secure group. A secure group is a collection of members who may be senders, receivers, or both senders and receivers of content. Group key management protocols ensure that only members of a secure group can gain access to group data and can authenticate group data by providing legitimate group members with the up-to-date cryptographic state that they need for their secrecy and authenticity requirements.

According to the group key management protocol, group members receive security associations (SAs). A Security Association (SA) is a set of policy and cryptographic keys that provide security services to network traffic that matches that policy. The SAs include encryption keys, authentication/integrity keys, cryptographic policy that describes the cryptographic algorithms and use of the cryptographic keys, and attributes such as an index for referencing the SA or particular objects contained in the SA.

The control over the distribution of SAs to members is performed by a Group Controller and Key Server (GCKS). In general, a member registers with the GCKS for authentication, and then receives information for initializing one or more security associations (SAs). For the purposes of the present application, the SA that each member receives when registering with the GCKS (for example an authentication SA) is referred to as a Registration SA. Other SAs that are provided include a Data Security Protocol SA (Data SA), which is used for securing group communication, and a re-key protocol SA, which is used when the GCKS periodically sends re-key messages to the group members. Re-key messages may result from group membership changes, the creation of new traffic protection keys for a particular group, or from key expiration.

As mentioned above, the Data SA may be used to secure communication between two or more members of a shared group. For example, the GCKS downloads a common group SA to the two or more members, which can then use the group SA for secure communication. The members may choose not to store the particular SA, due to policy or mechanism restrictions, or may store the group data SA in volatile memory. In the event of a power failure at one of the members of the group, the member can retrieve the data SA from the GCKS.

After a member or a group of members has registered with the GCKS, the GCKS stores the particular registration SA, data SA and re-key SA for that member or group in volatile memory. During operation, should re-keying of a group be required, the GCKS uses the stored data to transmit updated key information to each member of a group. One problem with the GCKS is that, in the event of a power failure or system re-boot, the registration SA, data SAs and other keying information for each member of the group is lost. The loss of keys requires that each member re-register and new keys be re-distributed to the group, thereby reducing the performance of the multicast application.

SUMMARY OF THE INVENTION

According to one aspect of the invention, a method for preserving security associations between at least two entities includes the steps of maintaining a security association relating to communication between the at least two entities in a table, and periodically storing the security association in non-volatile storage. With such an arrangement, in the event that data within the table become corrupted, it can be retrieved from storage. Because the security association data is stored, performance losses due to re-establishing the secure group are minimized. In one embodiment, the security association is advantageously encrypted prior to storage to further secure the security associations for each member.

DETAILED DESCRIPTION

Figure 1:
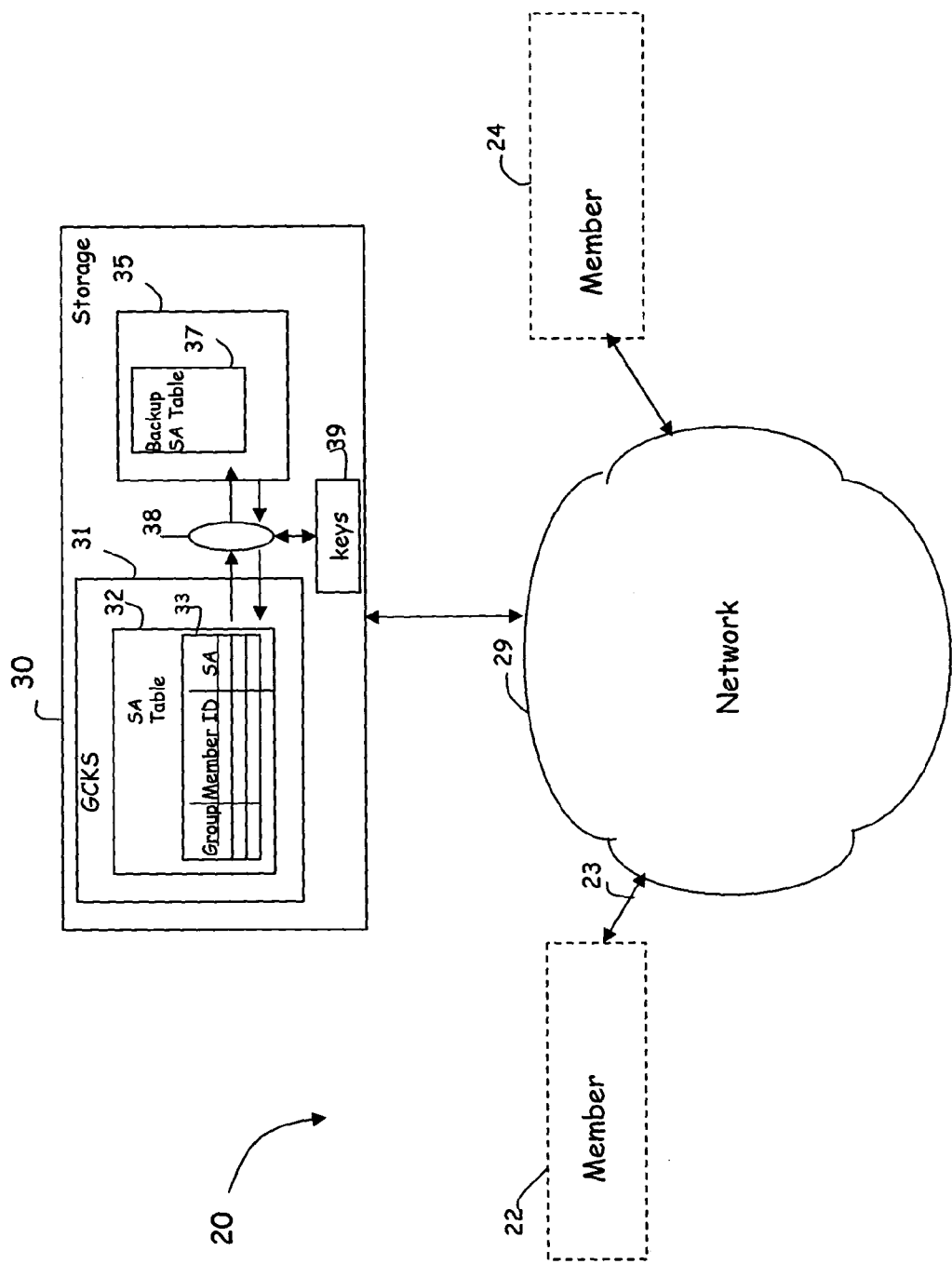
FIG. 1 illustrates a system wherein a global controller/key server of the present invention is coupled to members through a communication network.

FIG. 1 illustrates a system 20 illustrating a number of members 22 and 24 coupled to a server 30 via a communications network 29. The system of FIG. 1 is a generic system, and the members may be any type of device that is capable of receiving controlled data content, including a television, computer, wire-less device, etc. Thus, the network 29 may be any type of network, whether it is cable based, ISDN based, wireless or some combination thereof operating according to any communication protocol. Exemplary members include, for example, members of a private computer network who share a private network, or a cable consumers who receive content via a pre-paid service arrangement, such as pay-per-view, etc.

The server 30 is shown to include a Group Controller/Key Server (GCKS) 31 and storage 35. The server 30 that includes the GCKS 31 functionality is illustrated as a distinct entity. However, the present invention is not limited to any particular implementation or placement of the GCKS functionality, which may be implemented in hardware, software, or some combination thereof, and provided by a provider, a client, or as a distinct and separate entity. The GCKS 31 includes a security association (SA) table 32. The SA table 32 stores, for each member, the registration SA, and for each group, member IDs for each member of the group. In addition, the SA table 32 may also store Data SA used by each member of the group for accessing the content, and a Re-key SA for each group (wherein a group may include one or more members). The present invention is not limited to the storage of any particular type of SA.

Storage 35 is a non-volatile memory device, such as a removable flash card, tape device, NVRAM, hard disk, or any device that is able to retain its data in the presence of a power failure. Storage 36 is shown to include a backup SA table 37. The backup SA table 37 is used to store at least a portion of the contents of the SA table 32, including but not limited to the registration SAs associated with each member.

Advantageously disposed between the storage 35 and the GCKS 31 is encryption logic 38. Encryption logic 38 obtains key data from key 39. Key 39 is stored in a non-volatile memory device, such as an EEProm on the server 30, and in one embodiment is used to encrypt the portion of the SA table 32 prior to its storage in backup SA table 37.

The components in server 30 serve to maintain the security associations established between members of a group, or between members and the GCKS, in the event of a power fail, system re-boot, or other detection of corruption of the data in the SA table. Periodically during operation of the server, at least a portion of the contents of the SA table 32 are copied to the backup table 37. Because the backup table 37 is stored in non-volatile memory, in the event that the data within the SA table 32 becomes unavailable, it may easily be retrieved from the backup table without the necessity and time used to restore the security associations as in the prior art.

Figure 2:
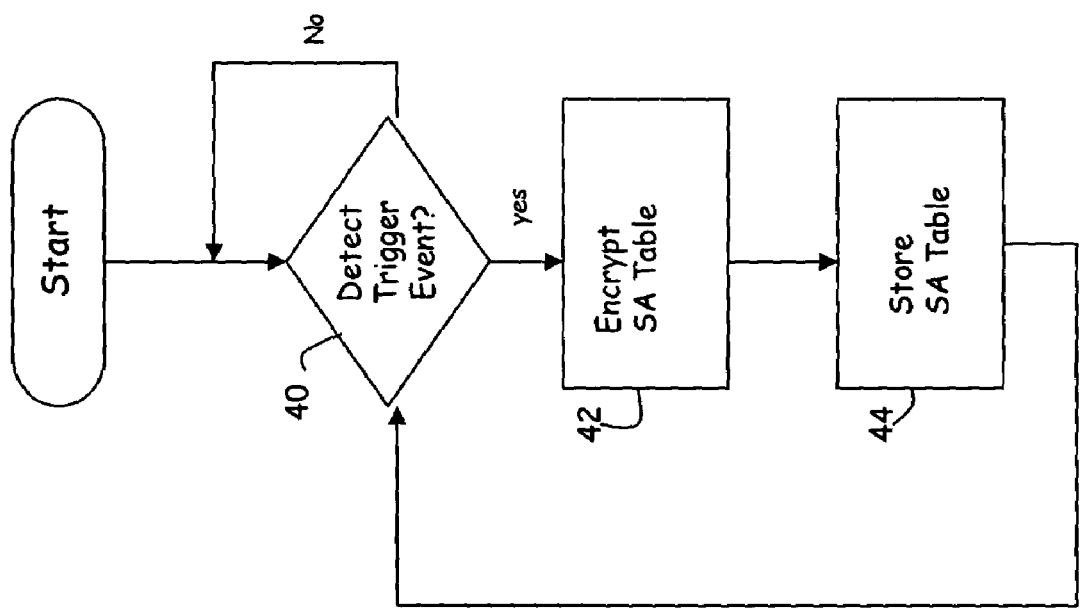
FIG. 2 is a flow diagram illustrating exemplary steps that may be taken for backing up the GCKS of FIG. 1 to permanent storage.

Referring now to FIG. 2, a flow diagram illustrating exemplary steps taken to back up the SA table include, at step 40, detecting a trigger event that causes the backup to occur. The trigger event may be any type of event, including a re-keying event (where one or more members of a group receives a new key), a periodic time interval is reached, or some other predetermined event occurs. The present invention is not limited to any particular type of event, although it is recognized that backing up after each re-keying event provides the most up to date version of the SA table in non-volatile memory.

Figure 3:
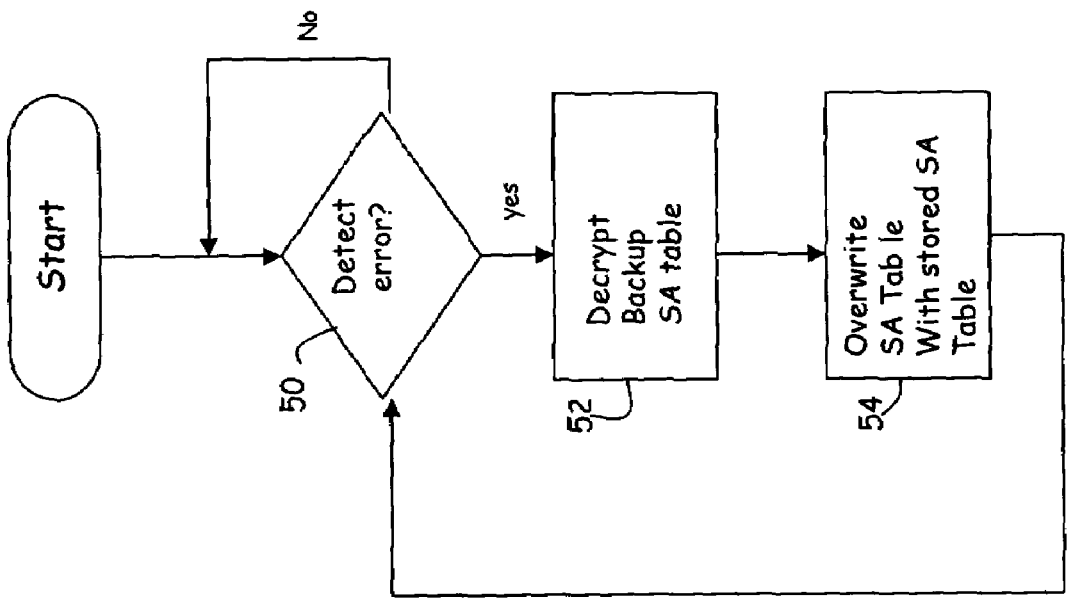
FIG. 3 is a flow diagram illustrating exemplary steps that may be taken for restoring the GCKS of FIG. 1 in the event that the GCKS becomes corrupted with data from the backup GCKS.

At step 40, when the trigger event occurs, at step 42 the portion of the SA table that is to be transferred to backup is encrypted using encryption logic 38 and key 39. At step 44 it is stored in the backup table 37. Referring now to FIG. 3, a flow diagram illustrating the restoration of the SA table is shown. At step 50, the process waits until the system event that results in the restore occurs. As mentioned above, the system event may be a re-boot, a power fail, a system interrupt, or a detection of corruption of the data in the SA table. When the event occurs, at step 52 the data in SA table 37 is decrypted using logic 38 and key 39, and the contents of the SA table 32 are over-written with the decrypted data.

It should be understood that steps 42 and 52, respectively, regarding encryption of the data provide increased security for the SA table, but are not a requirement of the invention.

Alternative embodiments of the invention may be implemented in any computer readable program language, whether it be conventional or object oriented, or alternatively using discrete components, integrated circuitry, programmable logic, microprocessors or any combination thereof. A computer program product implementation may include a series of computer instructions fixed either on a tangible medium, such as a computer readable media (e.g. diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g. microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in a memory device, such as semiconductor, magnetic, optical or other memory devices, and may be transmitted using any communications technology, such as optical, infrared, microwave, or other transmissions technologies.

Having described various embodiments of the invention, it is understood that the present invention should not be limited to any specific disclosure herein, but rather is embodied in the spirit and scope of the claims attached hereto.

What we claim is:

1. Method for preserving security associations between at least two member entities of a secure group comprising the steps of:

maintaining a security association relating to communication between the at least two member entities in volatile storage of a key server operative to distribute security associations;

storing a copy of the security association in non-volatile storage associated with the key server; and in response to detection of corruption of the security association in volatile storage, where the corruption is caused by an event other than power failure, employing the copy of the security association in non-volatile storage to update the security association in volatile storage.

2. The method according to claim 1, further comprising the step of encrypting the security association prior to storing the security association in the non-volatile storage.

3. The method according to claim 1 wherein the step of storing includes the step of detecting a trigger event.

4. The method according to claim 3 wherein the step of detecting a trigger event includes the step of detecting a change in the security association.

5. The method according to claim 1 further comprising the step of updating the contents of a security associations table using the security association stored in non-volatile storage.

6. An apparatus for distributing and preserving security associations between at least two member entities of a secure group comprises:

a volatile memory including a first table for storing a security association related to communication between the at least two entities;

a non-volatile memory including a second table for storing at least a portion of the first table;

means for copying the at least a portion of the first table to the second table; and means for copying at least a portion of the second table to the first table in response to detection of corruption of the first table, where the corruption is caused by an event other than power failure.

7. The apparatus of claim 6, further comprising means for encrypting the at least a portion of the first table prior to copying the at least a portion of the first table to the second table.

8. The apparatus of claim 6 further comprising means for copying overwriting the at least a portion of the first table with contents of the second table.

9. The apparatus of claim 6 including encryption logic for encrypting the at least a portion of the first table.

10. The apparatus of claim 6 including decryption logic for decrypting the second table.

11. The apparatus of claim 6 further comprising a key, stored in non-volatile memory, for encrypting the at least a portion of the first table.

* * * * *